United States Patent
Cardona

(10) Patent No.: US 11,114,234 B2
(45) Date of Patent: Sep. 7, 2021

(54) TRANSFORMER ARRANGEMENT AND METHOD FOR CONTROLLING PRESSURE IN A LIQUID-FILLED TRANSFORMER

(71) Applicant: ABB Power Grids Switzerland AG, Baden (CH)

(72) Inventor: Julian Cardona, Risaralda (CO)

(73) Assignee: ABB Power Grids Switzerland AG, Bades (CH)

( * ) Notice: Subject to any disclaimer, the term of this patent is extended or adjusted under 35 U.S.C. 154(b) by 41 days.

(21) Appl. No.: 15/580,553

(22) PCT Filed: Jun. 22, 2016

(86) PCT No.: PCT/EP2016/064398
§ 371 (c)(1),
(2) Date: Dec. 7, 2017

(87) PCT Pub. No.: WO2016/207207
PCT Pub. Date: Dec. 29, 2016

(65) Prior Publication Data
US 2018/0158596 A1 Jun. 7, 2018

(30) Foreign Application Priority Data
Jun. 25, 2015 (EP) .................................. 15173925

(51) Int. Cl.
*H01F 27/02* (2006.01)
*H01F 27/32* (2006.01)
(Continued)

(52) U.S. Cl.
CPC ......... *H01F 27/321* (2013.01); *F16K 17/196* (2013.01); *H01F 27/02* (2013.01); *H01F 27/14* (2013.01)

(58) Field of Classification Search
USPC ........................................ 336/94, 90, 55–61
See application file for complete search history.

(56) References Cited

U.S. PATENT DOCUMENTS

| | | |
|---|---|---|
| 1,860,511 A | 5/1932 | Nichols |
| 2,844,165 A | 7/1958 | Morse |

(Continued)

FOREIGN PATENT DOCUMENTS

| | | |
|---|---|---|
| AU | 2006264846 A1 | 1/2007 |
| CN | 86107085 | 3/1987 |

(Continued)

OTHER PUBLICATIONS

European Search Report Application No. 15173925.7 completed: Dec. 16, 2015; dated Jan. 12, 2016 9 Pages.

(Continued)

*Primary Examiner* — Shawki S Ismail
*Assistant Examiner* — Kazi S Hossain
(74) *Attorney, Agent, or Firm* — Sage Patent Group

(57) ABSTRACT

A transformer including a transformer tank, an expansion tank, and piping connecting the tanks enabling liquid to flow there between. The piping includes a valve configured for liquid to flow from the transformer to the expansion tank when the pressure is above a predefined first threshold and for preventing the liquid to flow from the transformer to the expansion tank when the pressure is below the first threshold. The valve is also configured for liquid to flow from the expansion to the transformer tank when the pressure is below a predefined second threshold and for preventing the liquid to flow from the expansion to the transformer tank when the pressure is above the predefined second threshold.

14 Claims, 3 Drawing Sheets

(51) Int. Cl.
*H01F 27/14* (2006.01)
*F16K 17/196* (2006.01)

(56) References Cited

U.S. PATENT DOCUMENTS

| | | | |
|---|---|---|---|
| 2,989,073 A | 6/1961 | Goodwin | |
| 4,145,679 A | 3/1979 | Mitchell, Jr. | |
| 5,167,804 A * | 12/1992 | Tiggelbeck | B01D 15/00 |
| | | | 210/167.32 |
| 5,282,492 A * | 2/1994 | Angeli | F16K 17/196 |
| | | | 137/493.4 |
| 7,902,951 B2 | 3/2011 | Findeisen | |
| 8,439,080 B2 | 5/2013 | Uusipaikka | |
| 2007/0241115 A1 | 10/2007 | Baumann et al. | |
| 2008/0197955 A1 * | 8/2008 | Findeisen | H01F 27/14 |
| | | | 336/58 |
| 2010/0296205 A1 * | 11/2010 | Wakchaure | H01F 27/14 |
| | | | 361/35 |
| 2012/0200961 A1 * | 8/2012 | Magnier | H01F 27/402 |
| | | | 361/37 |
| 2013/0195729 A1 * | 8/2013 | Woodall | C01B 3/08 |
| | | | 422/162 |

FOREIGN PATENT DOCUMENTS

| | | |
|---|---|---|
| CN | 201773670 U | 3/2011 |
| CN | 203397838 U | 1/2014 |
| CN | 203826167 U | 9/2014 |
| CN | 204242758 U | 4/2015 |
| EP | 1897102 A1 | 3/2008 |
| EP | 2738780 A1 | 6/2014 |
| FR | 84247 E | 12/1964 |
| GB | 209053 A | 6/1924 |
| JP | H10149922 A | 6/1988 |

OTHER PUBLICATIONS

International Search Report & Written Opinion of the International Searching Authority Application No. PCT/EP2016/064398 Completed Date: Sep. 8, 2016; dated Sep. 23, 2016 12 Pages.

Chinese Office Action and Translation Application No. 201680036006.1 Completed: Oct. 29, 2018 12 Pages.

Indian Office Action Application No. 201847002444 Completed: Dec. 27, 2019 6 Pages.

* cited by examiner

Temperature = ↑
Pressure = ↑

Temperature = ↑↑↑
Pressure = ↑↑↑

TRANSFORMER ARRANGEMENT AND METHOD FOR CONTROLLING PRESSURE IN A LIQUID-FILLED TRANSFORMER

TECHNICAL FIELD

The present disclosure relates to a liquid-filled transformer comprising a transformer tank, an expansion tank and piping connecting the transformer tank with the expansion tank for enabling liquid of the liquid-filled transformer to flow between the transformer tank and the expansion tank via the piping.

BACKGROUND

Oil-immersed transformers provide expansion systems to allow the expansion of the oil due to temperature change. The expansion system shall be sufficient to accommodate the change in liquid volume from the lowest level at coldest ambient temperature when the transformer is de-energized, to the highest level when the transformer is full loaded at maximum ambient temperature.

According to the international standards International Electrotechnical Commission (IEC) standard 60076-1 and Institute of Electrical and Electronics Engineers (IEEE) standard C57.12.00, there are the following types of liquid preservation system:
1. Freely breathing system or conservator system where there is free communication between the ambient air and an air-filled expansion space above the surface of the liquid, in the tank or in a separate expansion vessel (conservator). A moisture-removing breather is fitted in the connection to the atmosphere.
2. Diaphragm or bladder-type liquid preservation system where an expansion volume of air at atmospheric pressure is provided above the liquid but prevented from direct contact with the liquid by a flexible diaphragm or bladder. A moisture-removing breather is fitted in the connection to the atmosphere.
3. Inert gas pressure system where an expansion space above the liquid is filled with dry inert gas at slight over-pressure, being connected to either a pressure controlled source or an elastic bladder.
4. Sealed-tank system with gas cushion, in which a volume of gas above the liquid surface in a stiff tank accommodates the liquid expansion under variable pressure.
5. Sealed, completely filled system in which the expansion of the liquid is taken up by elastic movement of the permanently sealed, usually corrugated tank or radiators.

In order to utilize the gravitational force, the expansion vessel (e.g. a conservator), if used, is positioned above the transformer tank.

SUMMARY

It has been realized that the configuration with an expansion vessel/tank above the transformer tank has several problems, some of which are listed below:
1. The total size of the transformer arrangement is increased.
2. Many parts are required for assembly of the expansion tank, which may be a problem in seismically active geographical locations.
3. Maintenance and the assembly are risky and expensive due to the expansion tank being positioned high above ground and above the transformer tank.
4. It is time consuming to assemble and disassemble the transformer arrangement in the factory and on site.
5. High transport costs due to many separate parts. The expansion tank and supports are now shipped as separate pieces. with new method the expansion tank can be attached at the main tank and shipped all parts as only one piece.

Thus, it is an objective of the present invention to provide a solution to at least some of these problems relating to prior art transformer assemblies.

According to an aspect of the present invention, there is provided a transformer arrangement comprising a transformer tank for a liquid-filled electrical transformer, an expansion tank, and piping connecting the transformer tank with the expansion tank for enabling liquid of the liquid-filled transformer to flow between the transformer tank and the expansion tank via the piping. The piping comprises a valve. The valve is configured for allowing the liquid to flow from the transformer tank to the expansion tank when the pressure of the liquid in the transformer tank is above a predefined first threshold and for preventing the liquid to flow from the transformer tank to the expansion tank when the pressure of the liquid in the transformer tank is below the predefined first threshold. The valve is also configured for allowing the liquid to flow from the expansion tank to the transformer tank when the pressure of the liquid in the transformer tank is below a predefined second threshold and for preventing the liquid to flow from the expansion tank to the transformer tank when the pressure of the liquid in the transformer tank is above the predefined second threshold.

According to an aspect of the present invention, there is provided a method performed in a transformer arrangement comprising a liquid-filled transformer tank and an expansion tank. The method comprises allowing the liquid to flow from the transformer tank to the expansion tank via piping, when the pressure of the liquid in the transformer tank is above a predefined first threshold by automatically opening a valve of the piping. The method also comprises preventing the liquid to flow from the transformer tank to the expansion tank when the pressure of the liquid in the transformer tank is below the predefined first threshold by automatically closing the valve. The method also comprises allowing the liquid to flow from the expansion tank to the transformer tank when the pressure of the liquid in the transformer tank is below a predefined second threshold, lower than the first threshold, by automatically opening the valve.

By means of the valve which can automatically close and open in response to the varying pressure in the transformer tank, the pressure in the transformer tank can be controlled and the flow between the transformer tank and the expansion tank be handled without the need for positioning the expansion tank above the transformer tank. For instance, both the transformer tank and the expansion tank may be positioned on the ground or floor where the expansion tank may be easily accessible to maintenance personnel etc. In order to allow liquid flow from the expansion tank to the transformer tank, the piping typically extends down into the liquid phase of the expansion tank since otherwise gas (e.g. air), not liquid, may be sucked into the piping. The liquid may be any suitable transformer liquid, i.e. electrically insulating and suitable for the operating temperature of the transformer such as an ester liquid or an oil e.g. a mineral oil. The transformer may be any type of transformer but is typically rather bulky, e.g. a high-voltage transformer. With the expansion tank positioned next to the transformer tank, the expansion tank can be attached at the main tank and shipped together, reducing the number of parts and facilitating assembly.

The method may be performed by means of the transformer arrangement of the present invention.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
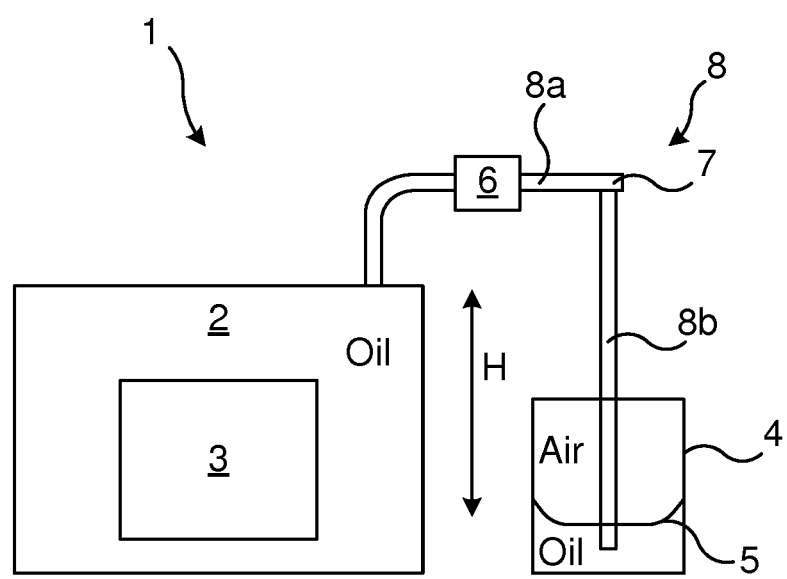
FIG. 1 is a schematic diagram in section, illustrating an embodiment of a transformer arrangement of the present invention.

FIG. 1 is a schematic diagram in section, illustrating an embodiment of a transformer arrangement 1 of the present invention. Since the present invention is concerned with the liquid handling, and not the electric components of the transformer, such electric components are not shown in the figure. The active parts of the transformer, such as core and windings are schematically illustrated as reference number 3 within the transformer tank 2 and will not be further discussed herein. The transformer tank is liquid-filled (typically completely liquid-filled, substantially without a gas phase), in this case with oil. Piping 8 connects the transformer tank 2 to an expansion tank 4 (e.g. a conservator), forming a conduit for the oil to flow between the tanks 2 and 4. The piping 8 comprises a valve 7 between a first pipe 8a connecting the valve to the transformer tank and a second pipe 8b connecting the valve to the expansion tank 4. A Buchholz relay 6 or other safety valve may be included with the first pipe 8a between the valve 7 and the transformer tank 2. The second pipe 8b extends below the surface of the oil phase in the expansion tank, to avoid sucking in gas phase (e.g. air) into the transformer tank via the valve 7. By means of the valve, the surface of the oil phase in the expansion tank may be below the surface of the oil in the transformer tank (i.e. the interface between the oil and the tank ceiling, as indicated by the double-headed arrow H. It may be advantageous to avoid direct contact between the oil phase and any gas phase in the expansion tank 4, in order to avoid gas to dissolve in the oil or otherwise enable gas to follow the oil into the transformer tank 2, why a diaphragm 5 or the like (e.g. a rubber film) is used. Thus, the upper surface of the oil phase in the expansion tank may be an interphase between the oil and the diaphragm, without any need for applying an over pressure in the expansion tank to induce a flow from the expansion tank to the transformer tank (although the invention could alternatively be used together with such applied over pressure, e.g. by means of a compressor or a pressurized gas source, depending on the values of the first and second thresholds).

Figure 2:
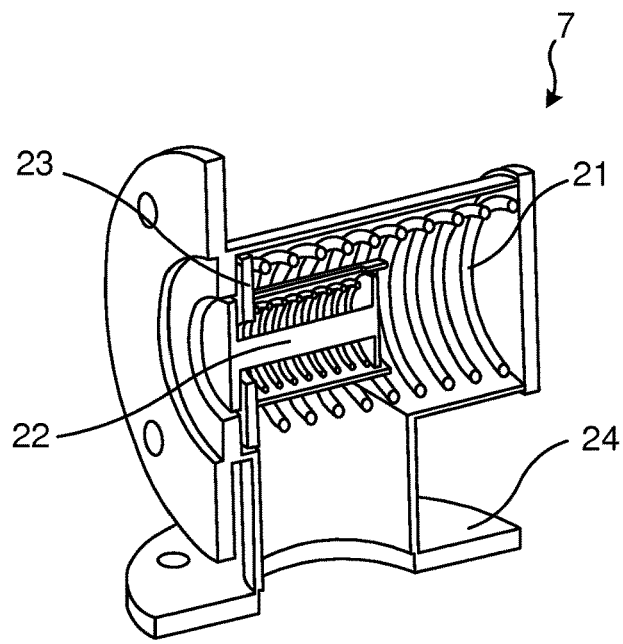
FIG. 2 is a schematic sectional view of an embodiment of a valve in accordance with the present invention.

FIG. 2 is a schematic sectional view of an embodiment of the valve 7 in accordance with the present invention. The valve is arranged as part of the piping 8, connecting the first and second pipes 8a and 8b to each other. At the valve, the first and second pipes may be arranged at an angle to each other to allow the preferred design of the valve 7 with will be discussed in the following. However, it is noted that other designs of the valve may alternatively be used to achieve the functionality of the valve in accordance with the present invention. The valve 7 may comprise two different valve parts, a first valve part for opening the valve when the liquid pressure in the transformer tank is above the first threshold (typically above ambient pressure, e.g. above atmospheric pressure), and a second valve part for opening the valve when the liquid pressure in the transformer tank is below the second threshold (typically below ambient pressure, e.g. below atmospheric pressure), the second threshold being different from the first threshold such that the valve is closed when the pressure in the transformer tank is between the first and second thresholds. The first and second valve parts may be separate, but may preferably be integrated with each other in the valve. In the example of the figure, the first valve part comprises an over pressure spring, e.g. a spiral spring, 21 which may be compressed to open the valve by an over pressure in the transformer tank (and thus in the first pipe 8a) above the first threshold. The second part may comprise a vacuum spring/valve, e.g. positioned within the spiral spring of the over pressure spring 21 (as shown in the figure). The vacuum spring is configured for release (the sealing part of the vacuum spring being pushed into the first pipe 8a), thereby opening the valve, when the pressure in the transformer tank (and thus in the first pipe 8a) is below the second threshold. The valve may comprise a first flange for connecting the valve to the first pipe 8a, as well as a second flange 24 for connecting the valve to the second pipe 8b. A sealing gasket 23 may be provided for sealingly engaging with the sealing part of the vacuum spring when the vacuum spring has not released to open the valve.

With reference to FIGS. 3a-e, the functionality of the valve 7 will now be discussed depending on varying pressure in the transformer tank 2.

Figure 3A:
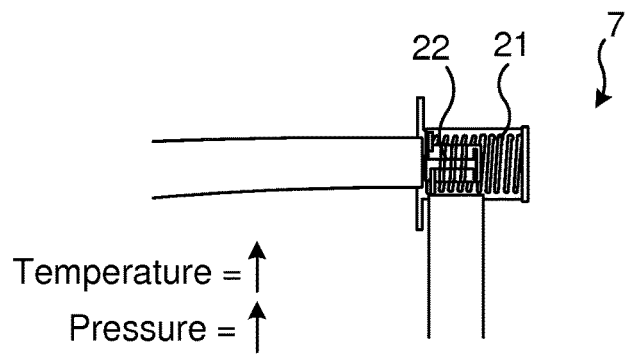
FIG. 3a is a schematic sectional view of a part of the piping comprising the valve in accordance with an embodiment of the present invention.

In the situation of FIG. 3a, the temperature, and thus the pressure, is slightly elevated (e.g. a bit, but not a lot, over atmospheric pressure) as indicated by the single upward pointing arrows. The over pressure is not enough to overcome the force of the over pressure spring 21, why the valve 7 remains closed and no liquid is flowing through the piping 8.

Figure 3B:
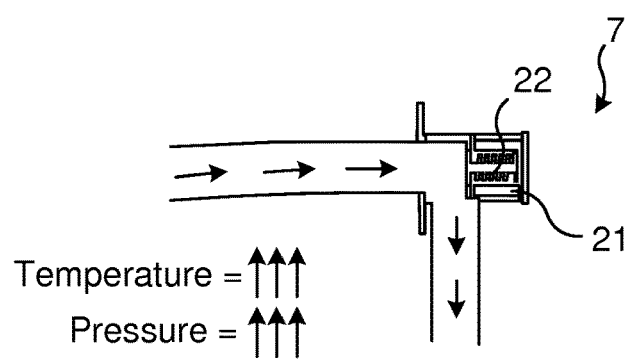
FIG. 3b is another schematic sectional view of a part of the piping comprising the valve in accordance with an embodiment of the present invention.

In the situation of FIG. 3b, the temperature, and thus the pressure, is substantially more elevated (e.g. a lot over atmospheric pressure) as indicated by the triplets of upward pointing arrows. The over pressure is enough to overcome the force of the over pressure spring 21, why the valve 7 is pushed open allowing liquid to flow through the piping 8 into the expansion tank 4. As can be seen in the figure, the vacuum spring 22, within the over pressure spring 22, is still closed but since the over pressure spring moves also the whole vacuum spring, the valve is opened regardless.

Figure 3C:
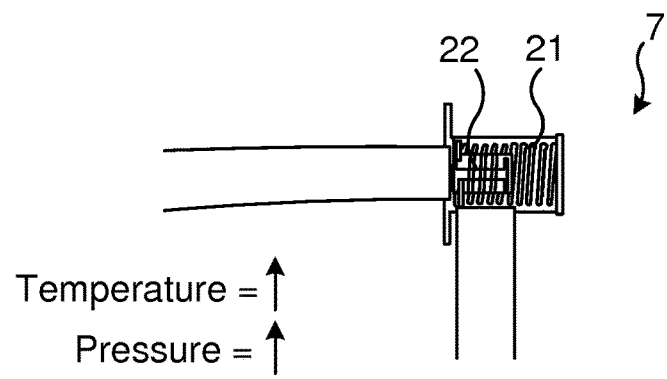
FIG. 3c is another schematic sectional view of a part of the piping comprising the valve in accordance with an embodiment of the present invention.

In the situation of FIG. 3c, the temperature, and thus the pressure, has returned to being only slightly elevated (e.g. a bit, but not a lot, over atmospheric pressure) as indicated by the single upward pointing arrows. The over pressure is no longer enough to overcome the force of the over pressure spring 21, why the valve 7 returns to its closed position and no liquid is flowing through the piping 8.

Figure 3D:
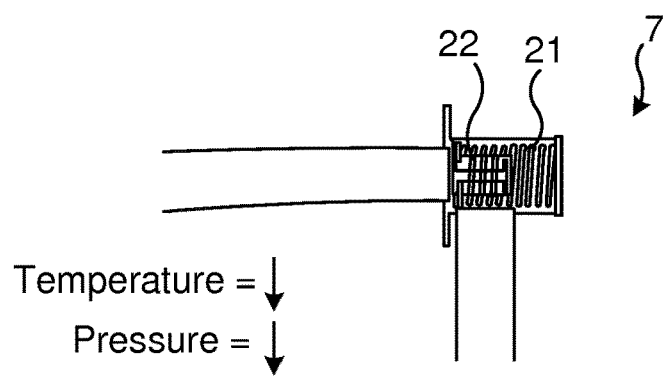
FIG. 3d is another schematic sectional view of a part of the piping comprising the valve in accordance with an embodiment of the present invention.

In the situation of FIG. 3d, the temperature, and thus the pressure, has fallen further, to be slightly reduced (e.g. a bit, but not a lot, below atmospheric pressure) as indicated by the single downward pointing arrows. The under pressure is not enough to overcome the force of the vacuum spring 22, why the valve 7 remains closed and no liquid is flowing through the piping 8.

Figure 3E:
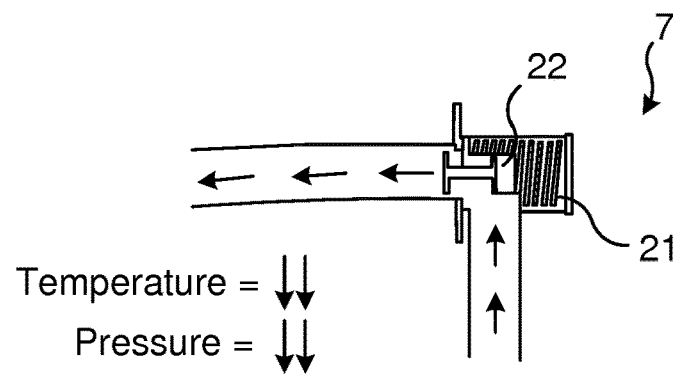
FIG. 3e is another schematic sectional view of a part of the piping comprising the valve in accordance with an embodiment of the present invention.

In the situation of FIG. 3e, the temperature, and thus the pressure, has been further reduced (e.g. substantially below atmospheric pressure, but the under pressure is not necessarily as high as the over pressure needed to open the valve by means of the over pressure spring 21) as indicated by the downward pointing arrow pairs. The under pressure is enough to overcome the force of the vacuum spring 22 (releasing it such that its sealing part is pulled and moved towards the transformer tank 2), why the valve 7 is opened and liquid is flowing through the piping 8 from the expansion tank 4.

In some embodiments of the present invention, the expansion tank 4 is positioned relative to the transformer tank 2 such as to allow a top surface of the liquid in the expansion tank to be lower than a top surface of the liquid in the transformer tank.

In some embodiments of the present invention, the valve 7 comprises an overpressure spring 21 for allowing the liquid to flow from the transformer tank 2 to the expansion tank 4 when the pressure of the liquid in the transformer tank is above the predefined first threshold and for preventing the liquid to flow from the transformer tank to the expansion tank when the pressure of the liquid in the transformer tank is below the predefined first threshold.

In some embodiments of the present invention, the valve 7 comprises a vacuum spring 22 for allowing the liquid to flow from the expansion tank 4 to the transformer tank 2 when the pressure of the liquid in the transformer tank is below the predefined second threshold and for preventing the liquid to flow from the expansion tank to the transformer tank when the pressure of the liquid in the transformer tank is above the predefined second threshold.

In some embodiments of the present invention, the piping further comprises a Buchholz relay 6 between the transformer tank 2 and the valve 7.

In some embodiments of the present invention, the expansion tank 4 comprises a diaphragm for separating the liquid from a gas phase in the expansion tank.

Embodiments of the present invention may convey at least some of the following advantages:

Improvement of safety conditions.
Reduction of design time and manufacturing time.
Less slender and high structure, giving a more compact design.
The expansion tank 4 may be integrated as a structural element of the transformer tank 2.
The total size of the transformer arrangement 1 is reduced.
Reduction of time for assembly in factory as well as time for assembly on site.
Reduction of transportation cost since less bulky design.
Total cost of the transformer arrangement is reduced.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A transformer arrangement comprising:
   a transformer tank for a liquid-filled electrical transformer;
   an expansion tank; and
   piping, connecting the transformer tank with the expansion tank for enabling liquid of the liquid-filled transformer to flow between the transformer tank and the expansion tank via the piping, the piping including a valve, wherein the piping includes a first pipe and a second pipe, the first pipe extending between the valve and the transformer tank, the second pipe extending between the valve and the expansion tank, and at the valve, the first pipe is arranged at a non-zero angle relative to the second pipe;
   wherein the valve is configured for allowing the liquid to flow from the transformer tank to the expansion tank when the pressure of the liquid in the transformer tank is above a predefined first threshold and for preventing the liquid to flow from the transformer tank to the expansion tank when the pressure of the liquid in the transformer tank is below the predefined first threshold;
   wherein the valve is configured for allowing the liquid to flow from the expansion tank to the transformer tank when the pressure of the liquid in the transformer tank is below a predefined second threshold and for preventing the liquid to flow from the expansion tank to the transformer tank when the pressure of the liquid in the transformer tank is above the predefined second threshold;
   wherein the expansion tank is positioned relative to the transformer tank such as to allow a top surface of the liquid in the expansion tank to be lower than a top surface of the liquid in the transformer tank; and
   wherein a portion of the piping connecting the valve to the expansion tank extends from above the top surface of the liquid in the expansion tank to below the top surface of the liquid in the expansion tank.

2. The transformer arrangement of claim 1, wherein the valve has an overpressure spring for allowing the liquid to flow from the transformer tank to the expansion tank when the pressure of the liquid in the transformer tank is above the predefined first threshold and for preventing the liquid to flow from the transformer tank to the expansion tank when the pressure of the liquid in the transformer tank is below the predefined first threshold.

3. The transformer arrangement of claim 1, wherein the valve has a vacuum spring for allowing the liquid to flow from the expansion tank to the transformer tank when the pressure of the liquid in the transformer tank is below the predefined second threshold and for preventing the liquid to flow from the expansion tank to the transformer tank when the pressure of the liquid in the transformer tank is above the predefined second threshold.

4. The transformer arrangement of claim 1, wherein the piping further includes a Buchholz relay between the transformer tank and the valve.

5. The transformer arrangement of claim 1, wherein the expansion tank includes a diaphragm for separating the liquid from a gas phase in the expansion tank.

6. A method performed in a transformer arrangement including a liquid-filled transformer tank and an expansion tank, wherein the expansion tank is positioned relative to the transformer tank such that a top surface of the liquid in the expansion tank is lower than a top surface of the liquid in the transformer tank, the method including:
    allowing the liquid to flow from the transformer tank to the expansion tank via piping, when the pressure of the liquid in the transformer tank is above a predefined first threshold by automatically opening a valve of the piping, the liquid being allowed to flow through a portion of the piping which connects the valve to the expansion tank and which extends from above the top surface of the liquid in the expansion tank to below the top surface of the liquid in the expansion tank, wherein allowing the liquid to flow from the transformer tank to the expansion tank via piping comprising allowing the liquid to flow through a first portion of the piping from the transformer tank to the valve at a non-zero angle at the valve relative to the portion of the piping which connects the valve to the expansion tank;
    preventing the liquid to flow from the transformer tank to the expansion tank when the pressure of the liquid in the transformer tank is below the predefined first threshold by automatically closing the valve; and
    allowing the liquid to flow from the expansion tank to the transformer tank when the pressure of the liquid in the transformer tank is below a predefined second threshold, lower than the predefined first threshold, by automatically opening the valve.

7. The method of claim 6, wherein the predefined first threshold is above ambient pressure and the predefined second threshold is below ambient pressure.

8. The transformer arrangement of claim 2, wherein the valve has a vacuum spring for allowing the liquid to flow from the expansion tank to the transformer tank when the pressure of the liquid in the transformer tank is below the predefined second threshold and for preventing the liquid to flow from the expansion tank to the transformer tank when the pressure of the liquid in the transformer tank is above the predefined second threshold.

9. The transformer arrangement of claim 2, wherein the piping further includes a Buchholz relay between the transformer tank and the valve.

10. The transformer arrangement of claim 2, wherein the expansion tank includes a diaphragm for separating the liquid from a gas phase in the expansion tank.

11. The transformer arrangement of claim 3, wherein the piping further includes a Buchholz relay between the transformer tank and the valve.

12. The transformer arrangement of claim 3, wherein the expansion tank includes a diaphragm for separating the liquid from a gas phase in the expansion tank.

13. The transformer arrangement of claim 4, wherein the expansion tank includes a diaphragm for separating the liquid from a gas phase in the expansion tank.

14. The method of claim 7, wherein the ambient pressure is atmospheric pressure.

* * * * *